United States Patent [19]

Hardy

[11] Patent Number: 4,498,645

[45] Date of Patent: Feb. 12, 1985

[54] WINGLESS AIRCRAFT WITH DUCTED VARIABLE PITCH AIRFOILS

[76] Inventor: Arthur L. Hardy, Lowell Rd., Windham, N.H. 03087

[21] Appl. No.: 437,215

[22] Filed: Oct. 28, 1982

[51] Int. Cl.³ ............................................. B64C 3/10
[52] U.S. Cl. ................................. 244/12.6; 244/4 R; 244/90 R; 244/13
[58] Field of Search .................. 244/4 R, 12.1, 12.6, 244/34 A, 36, 45 R, 198, 110 D, 113, 12.5, 13

[56] References Cited

U.S. PATENT DOCUMENTS

| | | | |
|---|---|---|---|
| 1,666,132 | 4/1928 | Gallet et al. | 244/12.1 |
| 1,693,159 | 11/1928 | Rickelmann | 244/34 A |
| 3,451,645 | 6/1969 | Wolcott | 244/36 |
| 3,586,266 | 6/1971 | Bucher | 244/36 |
| 3,610,557 | 10/1971 | Fellers | 244/113 |
| 3,847,368 | 11/1974 | Sakal, Jr. | 244/13 |
| 4,071,207 | 1/1978 | Piasecki et al. | 244/12.5 |

FOREIGN PATENT DOCUMENTS 893866 11/1944 France ............................... 244/34 A Primary Examiner—Trygve M. Blix
Assistant Examiner—Rodney Corl
Attorney, Agent, or Firm—E. Thorpe Barrett

[57] ABSTRACT

A wingless aircraft having a power channel with two parallel ducts afixed to the top of the fuselage. A jet engine or other drive mechanism is positioned within each duct. No air flow is permitted between any part of the lower surface of the power channel and the fuselage. Each duct contains a number of variable-pitch airfoils that are independently adjustable. This independence of adjustment between variable-pitch airfoils within a single duct and the ability to adjust the variable-pitch airfoils in one duct as a group independently of those in another duct provides horizontal stability and compensates for undesired yawing. The lift is controlled to somewhat by adjustment of the variable-pitch airfoils and the angle of attack, and to an even greater extent in cooperation with adjustable auxiliary wing panels mounted above openings in the upper surface of each duct above one of the variable-pitch airfoils. The auxiliary wing panels nest in openings above the airfoils when not in use. When needed, they are raised and offset laterally to provide increased lift and control of the aircraft.

1 Claim, 4 Drawing Figures

WINGLESS AIRCRAFT WITH DUCTED VARIABLE PITCH AIRFOILS

BACKGROUND OF THE INVENTION

1. Field of the Invention

This invention relates to wingless aircraft and more particularly to such an aircraft in which the primary lift and flight control is achieved with movable control and lift airfoils mounted within two continuous parallel channels extending the length of the aircraft fuselage.

2. Description of the Prior Art

Many types of wingless aircraft have been proposed, but none has met the exacting requirements of modern day aviation. The primary difficulties of such aircraft lie in the lack of flight stability, inadequate control during takeoff and landing and in conditions of air turbulence, and insufficient lift to permit economical operation.

U.S. Pat. No. 4,451,645 to Wolcott describes a wingless aerodynamic vehicle which has a plenum chamber extending horizontally over substantially the entire upper surface of the vehicle and which is open across the top to the ambient surroundings of the vehicle. A top opening in the plenum has a number of elongated airfoils extending in spaced parallel relationship across the plenum. The upper surfaces of the airfoils are substantially coplanar with other while the lower surfaces are inclined thereto so that a series of elongated nozzles are formed between the airfoils which discharge into the surroundings substantially tangentially to the upper surfaces mentioned above. The discharges from the nozzles interact with one another to generate an overall lift effect which is adapted in relation to the weight of the vehicle to displace the vehicle in a direction generally perpendicular thereto.

U.S. Pat. No. 3,586,266 to Bucher describes an aircraft without laterally extending wings. A supplemenatary wing is mounted on top of the streamlined body of a jet propelled aircraft. This wing is arcuate in cross section at the front and lateral sides are displaced from the fuselage of the aircraft. A plurality of channels extend longitudinally of the wing. The channels are open at the front so that air passes in freely. The air passing through the wing exerts a lifting effect. In addition, it is stated that the air under the wing at both sides exerts a further stabilizing and lifting effect. The patent also describes the use of movable flaps in the channels of the wing to be used for braking purposes.

Other types of wingless aircraft, that is, aircraft without laterally extending wing surfaces have been described in the literature for many years. The practical difficulties that have prevented such aircraft from being operated successfully include: lack of sufficient lift, lack of economy, inadequate control and, most importantly, lack of stability under takeoff, flight, and landing conditions.

SUMMARY OF THE INVENTION

The present invention provides a power channel, containing a series of at least two parallel ducts, formed integrally with the fuselage and extending atop the fuselage from front to rear. The propelling force, be it jet, propeller or other arrangement, is positioned at the entrance or exit of each of the ducts. No air flow is permitted between any part of the lower surface of the power channel and the fuselage. Each duct contains a number of variable-pitch airfoils that are independently adjustable. This independence of adjustment between variable-pitch airfoils within a single duct and the ability to adjust the variable-pitch airfoils in one duct as a group independently of those in another duct provides horizontal stability and compensates for undesired yawing. The lift is controlled to somewhat by adjustment of the variable-pitch airfoils and the angle of attack, and to an even greater extent in cooperation with adjustable auxiliary wing panels mounted in the upper surface of each duct above the respective variable-pitch airfoils.

DESCRIPTION OF THE PREFERRED EMBODIMENT

Figure 1:
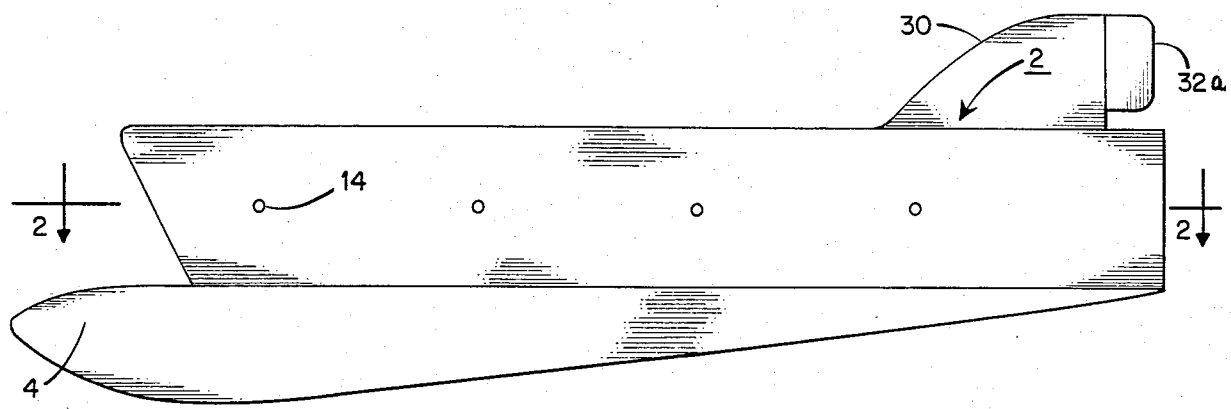
FIG. 1 is a partial side view of an aircraft embodying the invention with the auxiliary wing panels in closed position.
Figure 2:
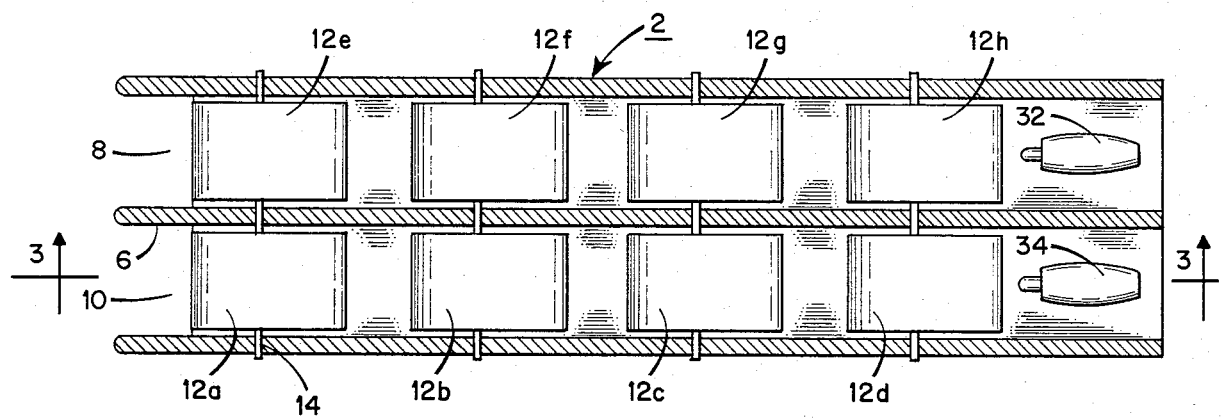
FIG. 2 is a section taken along line 2–2 of FIG. 1.

In the drawings, all structures are shown in diagrammatic form because the basic structures are applicable to any type aircraft from fighter planes to heavy transports. Those skilled in the art can readily apply the principles set forth here to aircraft of any sort, making those modifications and enhancements necessary for the particular application. Details of auxiliary parts of the aircraft, such as landing gear, etc. have been omitted as they form no part of the present invention.

A power channel, generally indicated at 2, is formed integrally with the fuselage 4 of the aircraft. The power channel 2 is formed by a central divider 6 into two longitudinal parallel ducts 8 and 10 extending the full length of the power channel. Four variable-pitch airfoils 12a, 12b, 12c and 12d are spaced equidistant along the duct 10.

Figure 3:
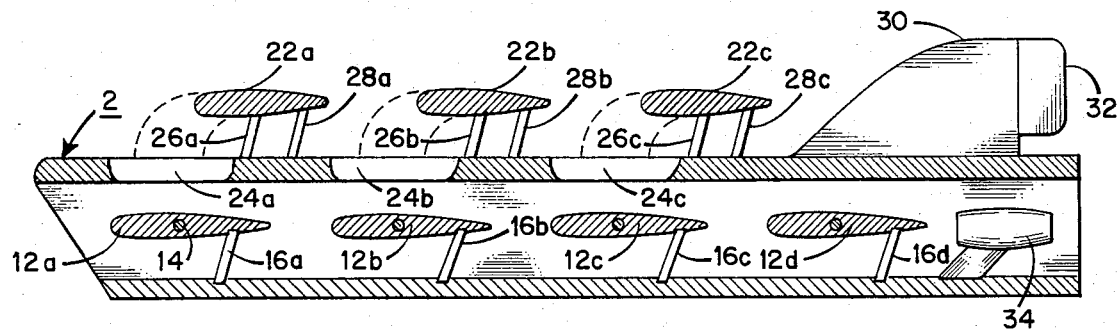
FIG. 3 is a section taken along line 3—3 of FIG. 2 showing the auxiliary wing panels in open position.
Figure 4:
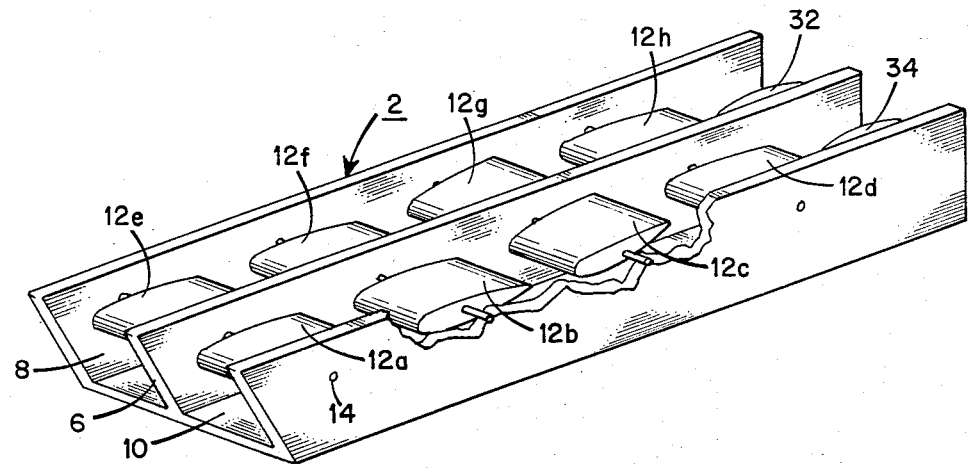
FIG. 4 is a perspective view of the power channel with the top section removed to show the variable-pitch airfoils within the two parallel ducts.

The airfoil 12a near the forward part of the power channel is pivoted, as indicated at 14, and its pitch is controlled by an arm 16a (FIG. 3). The arm 16a is driven by a conventional hydraulic control mechanism (not shown) by which the pilot, or an automatic flight control mechanism, can vary the pitch of the airfoil. The airfoils 12b, 12c and 12d are provided with similar pivots and control mechanisms indicated by the same numbers followed by the respective suffixes applied to the designations of the airfoils.

A corresponding set of airfoils 12e, 12f, 12g and 12h are mounted in the duct 8 and are pivoted and controlled in the same manner as the airfoils in duct 10. The two most rearward airfoils 12d and 12h are each arranged to pivot from an upper position, in which the upper surface of the airfoil forms an angle of about 30 degrees above the longitudinal plane of the power channel 2, downwardly until the airfoil engages the lower surface of the respective duct. In this position, the airfoils 12d and 12h effectively block the ducts 8 and 10 and thus provide an effective brake. The remaining airfoils pivot the same thirty degrees in an upward direction, but may be limited to only a thirty degree deflection in the downward direction.

The control mechanism is arranged for variations in the mode of its operation. In the normal flight condition, all of the airfoils are operated in synchronism by means of a single control. When turning the aircraft, or under conditions when yaw control is called for, the airfoils in duct 8 are operated in synchronism with each other but independent of the operation of the airfoils in duct 10. The airfoils in duct 10 are operated in synchronism, but independent of the airfoils in the duct 8. By the controlled passage of air through the two ducts, laterally displaced forces are generated that can be used either to compensate for yawing forces or in turning the aircraft.

To provide improved lift and control, a movable auxiliary wing panel 22a is mounted in an opening 24a in the roof of the power channel directly above the airfoil 12a. To increase the lift, and reduce the dependence upon the attack angle, the wing panel 22 is arranged to move along an arcuate path from its closed position to a position above the top of the power channel 2 and rearward of the opening 24a as shown in FIG. 3.

Two arms 26a and 28a are pivotally connected to the auxiliary wing at spaced points along one edge and extend, through appropriate slots in the roof of the power channel, to a hydraulic control mechanism (not shown). A similar pair of arms (not shown) are positioned on the opposite edge of the auxiliary wing 22a. The control mechanism is arranged to rotate both of these sets of arms to lift the auxiliary wing panel 22a from the opening 24a, moving it upwardly and rearwardly away from the opening. In this position the auxiliary wing panel 22a provides additional lift which is supplemented by increased lift of the airfoil 12a because of the increased reaction forces of the airfoil produced by the opening 24a.

The rearward arm 28a is rotatable around a pivot derived from the wall of the channel 2 and is also movable, under the direction of the control mechanism, in the direction of its longitudinal axis. The corresponding arm on the opposite side of the auxiliary wing panel 26a is also arranged for movement along its longitudinal axis. The arm 28a, together with its opposite counterpart, controls the pitch of the auxiliary wing panel 22a to attain the desired degree of lift.

Other auxiliary wing panels 22b and 22c are each positioned over one of the airfoils in the duct 10. The auxiliary wing panels 22a, 22b, and 22c, associated with the duct 10, are arranged for gang movement so that the position and pitch of each of these auxiliary wing panels change in unison. Another set of auxiliary wing panels (not shown), positioned identically with respect to duct 8 and also arranged for synchronized movement, are separately adjustable from those associated with the duct 10. Thus, the auxiliary wing panels are effective for controlling turns and for stabilization of the aircraft.

In the embodiment illustrated here, two jet engines 32 and 34 are positioned respectively at the rear of the ducts 8 and 10. Alternate modes of power include positioning the engines in the forward sections of the two ducts. A vertical stabilizer 30 and a movable rudder 32a extend upwardly from the top of the power channel 2. These illustrations are representative only and any available kind of engine and vertical stabilization may be used without departing from the spirit of the present invention.

The fuselage 4 is indicated only diagrammatically as its characteristics are unimportant to the present invention. It is only necessary that the power channel be formed integrally with the fuselage so that there is no air flow between any part of the power channel 2 and the fuselage 4. The term wingless aircraft as used herein means aircraft without wing surfaces extending laterally on either side of the fuselage for the purpose of providing the major lift forces.

From the foregoing it will be seen that my invention provides a practical arrangement for the elimination of laterally extending wing surfaces with all the attendant advantages. It will be clear that my structure, as illustrated here, is subject to the widest degree of modification within the scope of the spirit of my invention.

I claim:

1. A wingless aircraft comprising a fuselage, a power channel integrally secured to said fuselage having front and rear openings and first and second parallel horizontal linear ducts extending the length of said power channel, a first plurality of movable airfoils positioned in spaced relationship within and along said first duct, a second plurality of movable airfoils positioned in spaced relationship within and along said second duct, first and second drive engines positioned respectively within said ducts, control means for adjusting the pitch of each of said airfoils, the pitch of said second plurality of airfoils being adjustable independently from those of said first set of airfoils, said power channel having a plurality of top openings each positioned above one of said airfoils, a plurality of auxiliary wing panels each positioned in and substantially sealing one of said openings, pivot means for raising each of said auxiliary wing panels from its associated opening to a position above and at least partially laterally offset from its said associated opening, and means for controlling the pitch of said auxiliary wing panels.

* * * * *